UNITED STATES PATENT OFFICE.

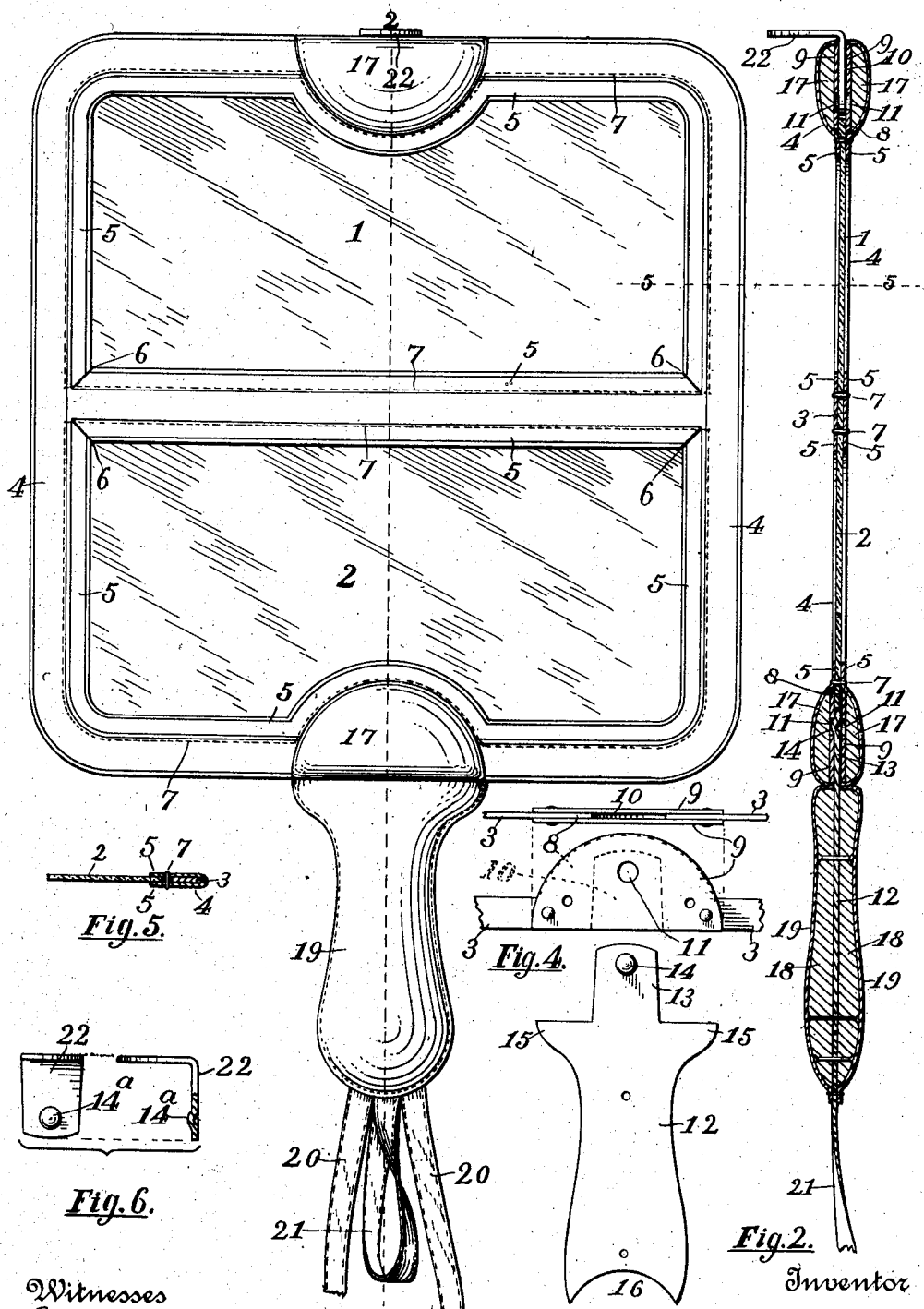

AUGUSTIN HENDRICKS, OF GRAND RAPIDS, MICHIGAN.

FACE-PROTECTOR.

No. 833,926.          Specification of Letters Patent.          Patented Oct. 23, 1906.

Application filed September 8, 1905. Serial No. 277,564.

*To all whom it may concern:*

Be it known that I, AUGUSTIN HENDRICKS, a citizen of the United States, residing at Grand Rapids, in the county of Kent and State of Michigan, have invented certain new and useful Improvements in Face-Protectors; and I do hereby declare the following to be a full, clear, and exact description of the invention, such as will enable others skilled in the art to which it appertains to make and use the same.

My invention relates to improvements in face-protectors, and more particularly to the kind shown in patent to myself jointly with Stephen G. Martin, numbered 797,002, dated August 15, 1905; and its object is to provide improved means for attaching and detaching the handle, to provide an improved frame, to provide means for detachably inserting the transparent panels, and to provide the device with various new and useful features, as hereinafter more fully described, and particularly pointed out in the claims, reference being had to the accompanying drawings, in which—

Figure 1 is an elevation of the device embodying my invention; Fig. 2, a vertical section of the same on the line 2 2 of Fig. 1; Fig. 3, a detail of the handle-plate; Fig. 4, a detail of the frame construction; Fig. 5, a sectional detail on the line 5 5 of Figs. 1 and 2, and Fig. 6 a detail of the hat-holder.

Like numbers refer to like parts in all of the figures.

1 and 2 represent transparent panels of the device, which may be of different colors, as heretofore provided in the patent above referred to. 3 represents a sheet-metal frame surrounding and extending between said panels and provided at its opposite ends with inwardly-extended enlargements 8 of semicircular outline and provided with recesses 10 to receive the shank of the handle. At opposite sides of these enlargements are correspondingly-shaped plates 9, secured to the frame 3 by rivets near their respective angles and yieldingly embracing the portions 8 of the frame. These plates 9 are provided with openings 11 opposite the recesses 10 to receive projections 14, formed of a raised portion stamped in the shank 13 of the handle-plate 12. This handle-plate is also provided with shoulders 15 at each side of the shank to abut against the edge of the frame 3, and thus further support the handle in position. The lower end of the handle-plate 12 is recessed, as at 16, to receive the ends of the straps 20 and 21, by which straps the device may be suspended from the arm of the user or upon any suitable support, as occasion arises.

Upon the outer surface of the plates 9 are pads 17, preferably of some slightly elastic material, and the handle-plate 12 is also provided with like pads 18 at its respective sides, which extend opposite the inner ends of the straps 20 and 21, to which pads the straps are secured and beyond which pads the shank 13 projects at the upper end of the handle a suitable distance to properly fit within the socket 10 and with the projection 14 engaging one of the openings 11 and so located on the shank as to firmly and detachably hold the shank within the socket 10.

The frame 3 and pads 17 are covered with a suitable material 4, preferably of leather or like flexible material, and projecting inwardly therefrom all round the transparent panels 1 and 2 serves to embrace the edges thereof and hold the same in place. This covering is secured in place by stitching 7, and the inwardly-projecting portion 5 is severed diagonally at the angles 6, through which openings thus formed the panels may be detachably inserted between the opposing projecting portions of the covering 5, and thus detachably secured in place. The framework of this device can thus be made of stamped sheet metal and the handle portion properly held in detachable relation by means requiring but little machinery or expense to produce. To engage and hold the rim of the user's hat or the front of a cap, I also provide a hat-holder consisting of a plate of metal 22, having a substantially right-angle bend near the middle, one end of which is adapted to be inserted in the upper handle-socket and secured therein by a projection 14$^a$ similar to the projection 14 on the shank of the handle. The other member projects horizontally from the upper edge of the frame and is engaged with the rim of the hat of the rider to hold the same in place, and the said rim also assists in supporting the device in front of the face of the user.

Having thus fully described my invention, what I claim, and desire to secure by Letters Patent, is—

1. In a face-protector, a frame having a socket provided with a yielding side, said side having an opening therein, a handle having a lug to enter the socket, and a projection on the lug to engage the opening.

2. In a face-protector, a frame having a recessed enlargement, a plate attached to the frame and having an opening opposite the recess of the enlargement, a handle-plate having a lug to enter the recess, and a projection on the lug to engage the opening.

3. In a face-protector, a sheet-metal frame having an inwardly-projecting portion provided with a recess, plates attached to the frame opposite said portion and provided with openings opposite the recess, a handle-plate, a lug on the handle-plate and adapted to enter the recess, and a projection on the lug to engage the openings in the plates.

4. In a face-protector, a sheet-metal frame having recessed inwardly-projecting portions, plates secured to the frame opposite said portions and having openings, a handle-plate having shoulders to engage the edge of the frame, a lug on the handle-plate to enter the recess, and a projection on the lug to engage the openings in the plates.

5. In a face-protector, a frame having sockets with yielding sides provided with openings, a handle-plate having a recess at one end, a lug on the other end of the handle-plate to enter said sockets, a projection on the lug to engage said openings, pads on the respective sides of the handle-plate, straps inserted in the recess of the handle-plate, and secured to the pads, and a cover inclosing the pads and handle-plate.

6. In a face-protector, a transparent panel, a frame surrounding the panel, and a cover on the frame, said cover being secured to the frame and projecting inward at each side of the panel, the inwardly-projecting portion of the cover being severed at the angles to permit of detachably inserting the panel.

7. In a face-protector, a transparent panel, a sheet-metal frame surrounding the panel and having a recess in its edge, yielding plates attached to the frame opposite the recess and having openings, pads opposite the plates, a cover on the frame and pads and projecting inward at each side of the panel, a handle-plate having a lug to enter the recess, a projection on the lug to engage the openings in the plates, pads on the handle-plate, and a cover inclosing the pads and handle-plate.

8. In combination with a face-protector having end sockets and a handle adapted to detachably engage said sockets, a hat-holder also adapted to detachably engage said sockets and to project therefrom to engage a hat.

9. In a face-protector, a frame having sockets at its respective ends, each provided with a yielding side having an opening, a handle and a hat-holder detachably inserted in said sockets and each having a projection to engage said openings.

In testimony whereof I affix my signature in presence of two witnesses.

AUGUSTIN HENDRICKS.

Witnesses:
GEORGIANA CHACE,
LUTHER V. MOULTON.